United States Patent [19]

Shimizu et al.

[11] Patent Number: 5,911,130
[45] Date of Patent: Jun. 8, 1999

[54] AUDIO SIGNAL COMPRESSION AND DECOMPRESSION UTILIZING AMPLITUDE, FREQUENCY, AND TIME INFORMATION

[75] Inventors: Kyoichi Shimizu, Yokohama; Toshihiro Maruyama, Kawasaki; Takafumi Kizuki, Yokosuka, all of Japan

[73] Assignee: Victor Company of Japan, Ltd., Yokohama, Japan

[21] Appl. No.: 08/739,553

[22] Filed: Oct. 30, 1996

[51] Int. Cl.$^6$ ........................................... G10L 3/02
[52] U.S. Cl. ........................ 704/500; 704/229; 704/230
[58] Field of Search ................................... 704/201, 203, 704/224, 225, 226–230, 500–502

[56] References Cited

U.S. PATENT DOCUMENTS

| | | | |
|---|---|---|---|
| 5,299,240 | 3/1994 | Iwahashi et al. | 375/122 |
| 5,392,231 | 2/1995 | Takahashi | 364/275 |
| 5,394,473 | 2/1995 | Davidson | 395/2.67 |
| 5,473,727 | 12/1995 | Nishiguchi et al. | 395/2.31 |
| 5,475,789 | 12/1995 | Nishiguchi | 395/2.38 |
| 5,566,154 | 10/1996 | Suzuki | 395/2.38 |
| 5,634,082 | 5/1997 | Shimoyoshi et al. | 395/2.38 |
| 5,717,670 | 2/1998 | Mitsuno | 369/48 |

*Primary Examiner*—David R. Hudspeth
*Assistant Examiner*—Michael N. Opsasnick
*Attorney, Agent, or Firm*—Michael N. Meller

[57] ABSTRACT

An audio signal is compressed and decompressed. The audio signal is sampled per regular sampling interval to obtain sampled values. The sampled values are orthogonal-transformed per constant period to obtain sequential orthogonal transfer functions. Feature points are extracted that represent change in coefficient intensity of the orthogonal transfer functions per constant frequency interval. Coefficient intensity data, frequency data, and time data of the feature points are obtained. The orthogonal transfer functions are reproduced by interpolating the coefficient intensity of the orthogonal transfer functions on the basis of the coefficient intensity data, frequency data, and time data. The reproduced orthogonal transfer functions are inverse orthogonal-transformed to reproduce the sampled values. And, the reproduced sampled values are converted into the audio signal.

20 Claims, 6 Drawing Sheets

FIG. 11B

AUDIO SIGNAL COMPRESSION AND DECOMPRESSION UTILIZING AMPLITUDE, FREQUENCY, AND TIME INFORMATION

BACKGROUND OF THE INVENTION

The present invention relates to an audio signal compression and decompression, and more specifically to a method of increasing the transmission efficiency and of decreasing the capacity of data storage medium, by compressing audio data markedly. The method can be applied to a technical field for handling audio signals such as broadcasting, moving picture, telephone, TV conference, audio package, audio TV game, etc.

Conventionally, various high efficiency coding methods for audio signals have been so far proposed, and adopted to various audio systems.

For instance, there have been known ADPCM (Adaptive Delta Pulse Code Modulation) method, sub-band coding method, orthogonal transform method, linear prediction method, variable sampling method, etc. In these methods, various algorithms have been proposed and executed to increase the transmission efficiency of audio signals, by removing the redundancy of the quantity of audio data and by compressing audio data to be transmitted by utilization of the human auditory characteristics in such a way that the distortion can be noticed at as small a level as possible.

Here, in the case of the ADPCM method, an adaptive quantization step is introduced to a differential PCM method for using the preceding sampled value as a predicted value, and a difference between the predicted signal value and the true signal value is adaptively quantized without directly quantizing the signal, which is now widely used for recording a message by a multi-function telephone set.

In the case of the sub-band coding method, the audio signals are divided into a number of sub-bands, and each divided sub-band is quantized by the smallest possible number of bits by utilization of the auditory characteristics of each sub-band.

In the case of the orthogonal transform method, the audio signals are separated away at regular time intervals (time window: 5 to 50 msec); after having been transformed into frequency ranges in accordance with discrete Fourier transformation (DFT) or discrete cosine transformation (DCT), the audio signals are divided into groups corresponding to a critical band width; and only the predominant components of the spectrum are quantized by the smallest possible number of bits under consideration of the masking effect.

In the case of the linear prediction method, the predicted values are obtained in accordance with a spectrum analysis based upon a mathematical model (self recursive model) such that the sampled value can be represented by a linear combination of the past sampled value and the present sampled value; and a difference between the predicted sampled value and the true sampled value is coded.

Further, in the case of the variable sampling method, the sampled frequency is changed by utilization of the fact that the upper band limit of audio signals changes.

On the other hand, various methods have been so far proposed and executed with respect to video signal coding. When roughly classified on the basis of the algorithm, there are PCM coding method, prediction coding method, orthogonal transform coding method, hybrid coding method, etc. Further, various practical ways have been proposed for each method.

In the case of video signals, since picture is constructed by a number of scanning lines, there exist such features that the correlation between the adjacent pixels is large in the right and left direction and in the upper and lower direction and further the correlation between two frames is extremely strong in relatively motionless picture.

In other words, it is possible to code the video signals effectively in two dimensions (the intra-frame) and further between three dimensions (the inter-frame) as well as the one dimension (the scanning lines). Further, the video signal band can be compressed largely in accordance with prediction coding (ΔM method, DPC method, etc.) or the orthogonal transform coding (Adamarl transform coding, Fourier transform coding, cosine transform coding, etc.). In addition, it is also possible to improve the coding efficiency of moving picture markedly by executing the motion compensation prediction such as MPEG (Moving Picture Image Coding Experts Groups).

On the other hand, audio signals are of analog asynchronous signals of one dimension from the standpoint of the nature. Therefore, even if there exists a similarity between the adjacent phonemes, when the audio signals are divided into signal group blocks, there exists no correlation between the divided blocks.

Therefore, in the above-mentioned conventional high efficiency coding methods for audio signals, the redundancy of audio signals is only removed by utilization of the predictability based upon the similarity between two adjacent phonemes or upon several phonemes existing immediately before the time band. Or else, audio signals to be transmitted are only compressed by masking for unitizing the auditory characteristics. Therefore, it is impossible to compress audio signals markedly at a high efficiency, being different from video signals.

SUMMARY OF THE INVENTION

With these problems in mind, therefore, it is the object of the present invention to provide an audio signal compression and extension method and apparatus, by which audio signals can be compressed markedly by utilizing the similarity in the spectrum coefficient intensity of the orthogonal transform function at each frequency. Therefore, the method according to the present invention can increase the audio data transmission efficiency and to decrease the capacity of a data storage medium.

Here, the similarity in the spectrum coefficient intensity of the orthogonal transform function at each frequency is based upon the following fact: when the sampled values of audio signals are grouped for each constant time band and further the grouped audio signals are orthogonal-transformed, there exists such a tendency that relatively similar spectrum coefficient intensity of the orthogonal transform function appears continuously at each frequency in a time band in which audio signals do not change violently.

To achieve the above-mentioned object, the present invention provides a method of compressing and decompressing an audio signal, comprising the steps of: sampling an audio signal per regular sampling interval to obtain sampled values; orthogonal transforming the sampled values per constant period to obtain sequential orthogonal transfer functions; extracting feature points representing change in coefficient intensity of the orthogonal transfer functions per constant frequency interval; and obtaining coefficient intensity data, frequency data, and time data of the feature points; reproducing the orthogonal transfer functions by interpolating the coefficient intensity of the orthogonal transfer functions on the basis of the coefficient intensity data, frequency data, and time data; inverse-orthogonal transforming the reproduced orthogonal transfer functions to reproduce the sampled values; and converting the reproduced sampled values into the audio signal.

Further, the present invention provides a method of compressing an audio signal, comprising the steps of: sampling an audio signal per regular sampling interval to obtain sampled values; orthogonal-transforming the sampled values per constant period to obtain sequential orthogonal transfer functions; extracting feature points of change in coefficient intensity of the orthogonal transfer functions per constant frequency interval; and obtaining coefficient intensity data, frequency data, and time data of each feature point, as compression data of the audio signals.

Further, the present invention provides a method of decompressing an audio signal, comprising the steps of: reproducing sequential orthogonal transfer functions obtained by orthogonal-transforming sampled values of an audio signal, the orthogonal transfer functions having feature points representing change in coefficient intensity of the orthogonal transfer functions, the feature points having coefficient intensity data, frequency data, and time data, by interpolating the coefficient intensity of the orthogonal transfer functions on the basis of the coefficient intensity data, frequency data, and time data; inverse-orthogonal-transforming the reproduced orthogonal transfer functions, to reproduce the sampled values; and converting the sampled values into the audio signal.

Further, the present invention provides an apparatus of compressing an audio signal, comprising: means for sampling an audio signal per regular sampling interval to obtain sampled values; means for orthogonal transforming the sampled values per constant period to obtain sequential orthogonal transfer functions; means for extracting feature points representing change in coefficient intensity of the orthogonal transfer functions per constant frequency interval; and means for obtaining coefficient intensity data, frequency data, and time data of the feature points.

Further, the present invention provides an apparatus of decompressing an audio signal, comprising: means for reproducing sequential orthogonal transfer functions obtained by orthogonal-transforming sampled values of an audio signal, the orthogonal transfer functions having feature points representing change in coefficient intensity of the orthogonal transfer functions, the feature points having coefficient intensity data, frequency data, and time data, by interpolating the coefficient intensity of the orthogonal transfer functions on the basis of the coefficient intensity data, frequency data, and time data; means for inverse-orthogonal-transforming the reproduced orthogonal transfer functions, to reproduce the sampled values; and means for converting the sampled values into the audio signal.

DETAILED DESCRIPTION OF THE PREFERRED EMBODIMENTS

An embodiment related to the audio signal compression and extension method according to the present invention will be described in detail hereinbelow with reference to the attached drawings.

Figure 1:
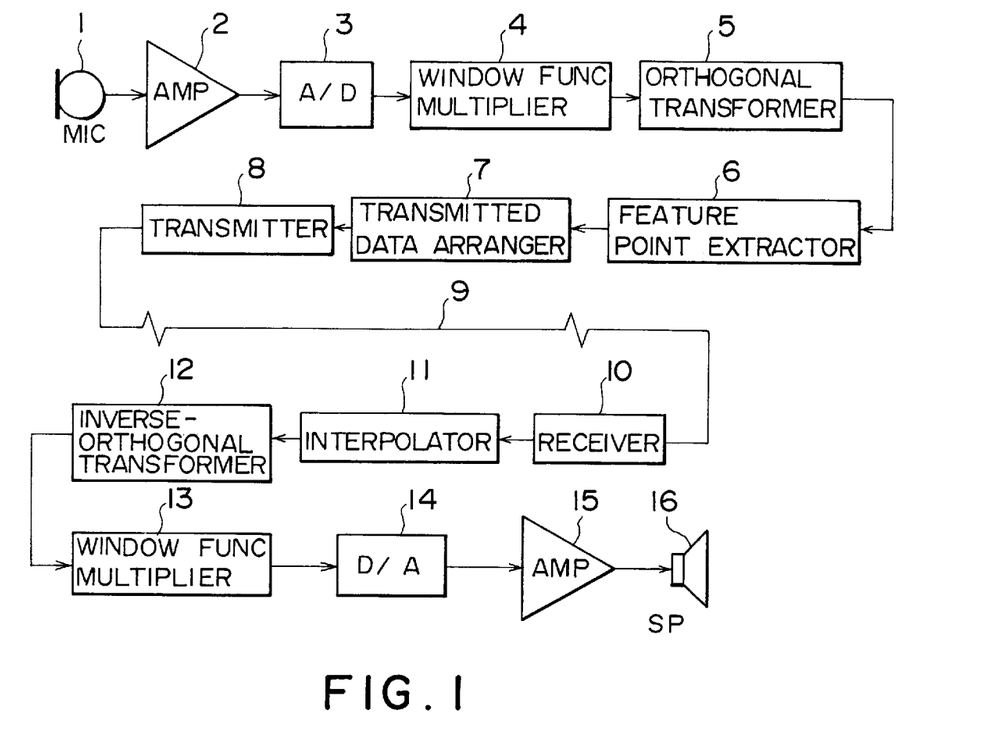
FIG. 1 is a block diagram showing an audio signal transmission and reception system related to the embodiment of "the audio signal compression and extension method" according to the present invention.

FIG. 1 is a block diagram showing an audio signal transmission and reception system. The transmission system is provided with a microphone 1, an amplifier 2, an A/D converter 3, a window function multiplier 4, an orthogonal transformer 5, and a feature point extractor 6, a transmitted data arranger 7, and a transmitter 8. The audio signals collected by the microphone 1 are quantized and compressed, and further the compressed data are transmitted to the reception system via a transmission path (or a storage medium) 9.

The reception system is provided with a receiver 10, an interpolator 11, an inverse-orthogonal transformer 12, a window function multiplier 13, a D/A converter 14, an amplifier 15, and a speaker 16. The audio signals compressed by the transmission system are decompressed and reproduced, and then the decompressed data are outputted through the speaker 16 as reproduced sound.

The above-mentioned transmission system compresses and transmits audio signals in accordance with the following procedure:

The audio signals detected by the microphone 1 are amplified by the amplifier 2 to a desired voltage amplitude, and then quantized at constant sampling intervals ($\Delta t$) by the A/D converter 3.

Further, a string of discretely quantized data obtained by the A/D converter 3 is divided into blocks per constant number of sampled values (e.g., for each 1024 sampled values) by the window function multiplier 4. The sampled values at a front end portion of one block are overlapped with the sampled values at a rear end portion of anterior block. Further, the sampled values at a rear end portion of the one block are overlapped with the sampled values at a front end portion of the posterior block. This will be described in detail later with reference to FIG. 7. Then each overlapped portion is multiplied by a window function. The reason is as follows: when the discretely quantized data string is divided into blocks, since many discontinuous points often occur between two adjacent blocks, errors of the spectrum coefficient intensity (described later) increase due to the presence of the discontinuous points. Therefore, the error is compensated for by use of a window function (sine square, cosine square, Hunning or Hamming function, etc.).

Successively, the sampled values of the blocks are orthogonal-transformed in accordance with FFT (Fast Fourier Transform) by the orthogonal transformer 5 to obtain an orthogonal transform function per block.

Figure 2:
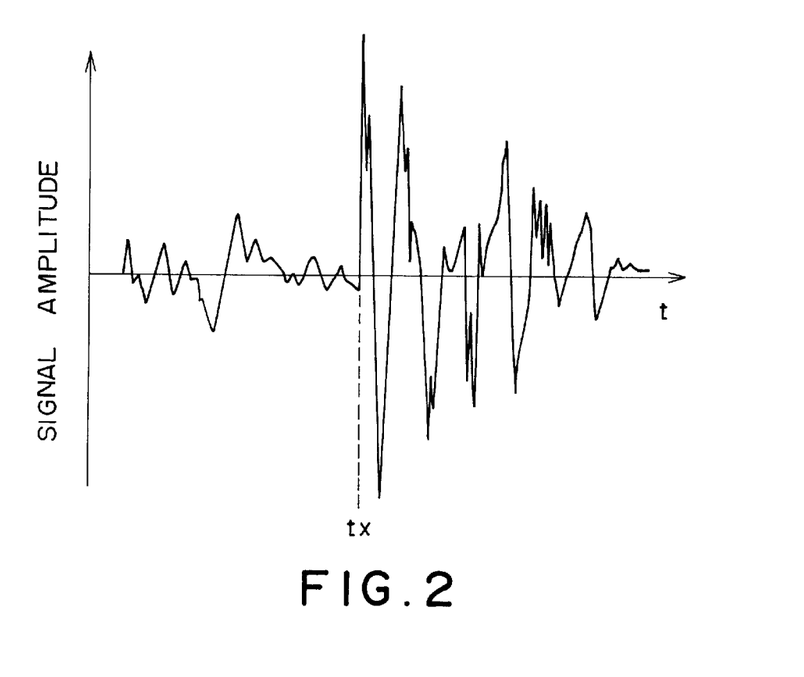
FIG. 2 is a graphical representation showing an example of audio signal waveforms obtained on the transmission system side shown in FIG. 1.
Figure 3:
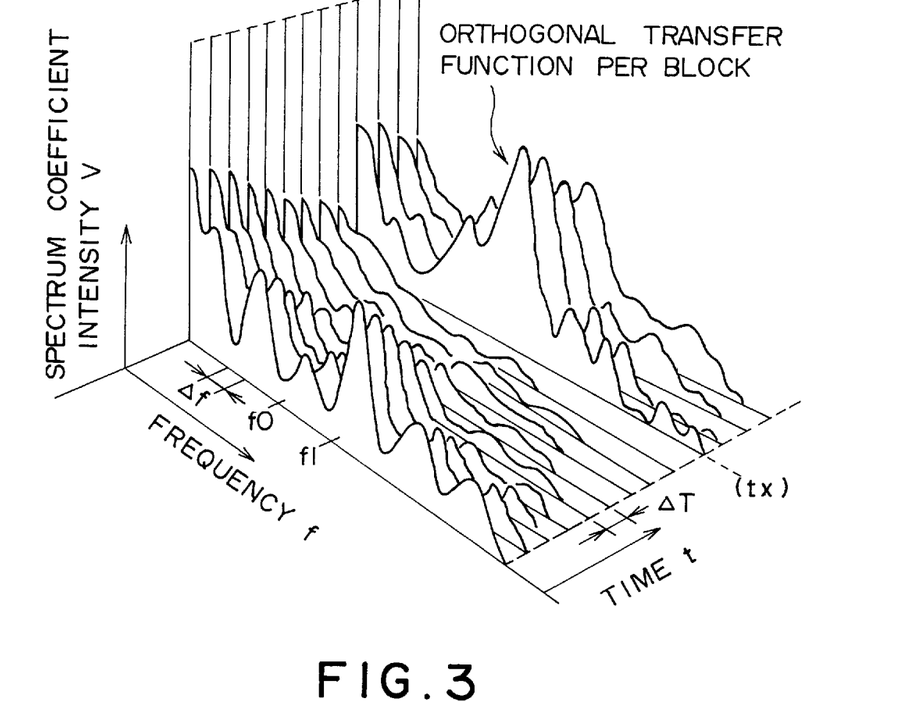
FIG. 3 is a graphical representation showing the orthogonal transformation functions.

In this case, when audio signals, for instance as shown in FIG. 2 are obtained by the amplifier 2, sequential block orthogonal functions are obtained as shown in FIG. 3. In FIG. 3, ΔT indicates a period during which the sampled values per block are obtained.

Here, FIG. 2 shows the audio signal waveform obtained when a loud sound (e.g., a shock sound) is inputted at a time tx. In this case, the obtained orthogonal transform function related to the block at the time tx changes violently as shown in FIG. 3.

Here, functions F0 and F1 with respect to the spectrum coefficient intensity of the sequential orthogonal transform functions at two frequencies f0 and f1 are taken into account in FIG. 3. It can be understood by FIG. 4 that the spectrum coefficient intensity on both functions F0 and F1 changes relatively small between time t=0 and time tx, but changes abruptly immediately after time tx, and then small again.

Figure 4:
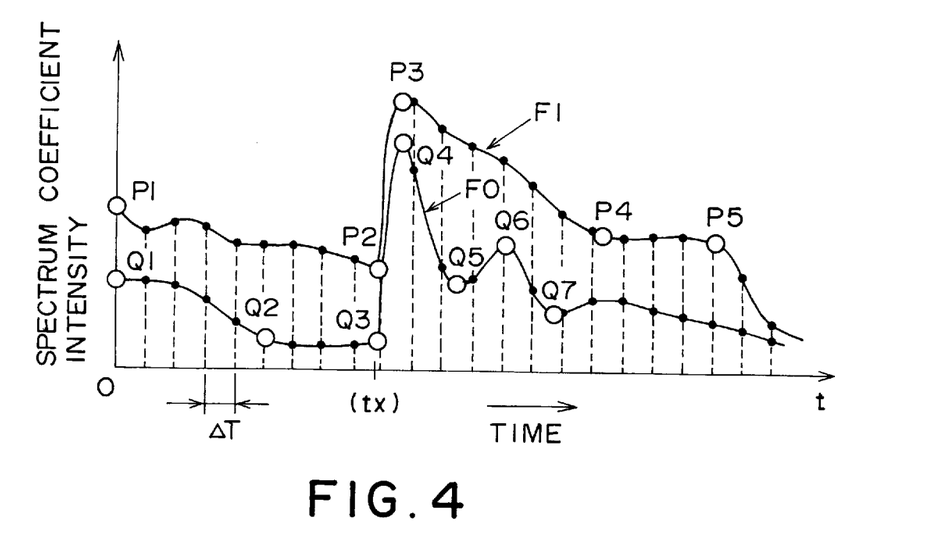
FIG. 4 is a graphical representation showing the functions F0 and F1 of the spectrum coefficient intensity of the orthogonal transform functions at frequencies f0 and f1, respectively.
Figure 5:
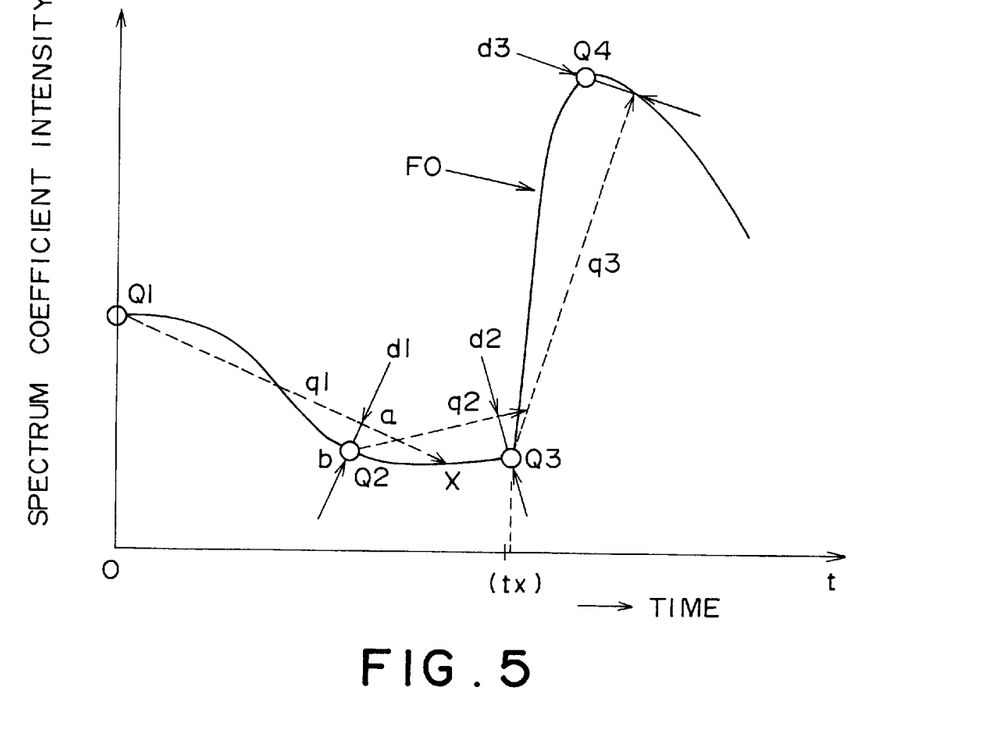
FIG. 5 is a graphical representation for assistance in explaining how to extract the feature points.

In FIG. 1, the feature point extractor 6 extracts feature points on the basis of change in the spectrum coefficient intensity in accordance with the method as shown in FIG. 5. FIG. 5 shows the method of obtaining the feature points on the basis of the function F0 of the spectrum coefficient intensity at the frequency f0 as shown in FIG. 4.

In FIG. 5, Q1 denotes the coefficient intensity at time t=0. A vector q1 extends from a start point Q1 to an end point X on the function F0. Next, the maximum distance dmax between a point "a" on the vector q1 and a point "b" on the function F0 is obtained. The point "b" is the point at which a straight line passing through the point "a" and perpendicular to the vector q1 intersects the function F0. This algorithm continues to extend vectors from the start point Q1 to end points on the function F0 until a maximum distance dmax exceeds a threshold value. The point "b" at which the maximum distance dmax exceeds the threshold value is determined as a feature point Q2.

This algorithm continues to extend vectors q2 from the start point Q2 to obtain a feature point Q3. In this case, since the spectrum coefficient intensity of the orthogonal transform function at the time tx changes violently, the point corresponding to the time tx on the function F0 becomes the feature point Q3.

After that, features points Q4, Q5, Q6, . . . are obtained in sequence in the same algorithm as described above. Further, the respective coefficient intensity data and the time data at the respective feature points, Q1, Q2, Q3, . . . , are also obtained, and these data are saved together with the frequency data f0 related to the function F0.

Further, in FIG. 4, feature points P1, P2, P3, . . . , are also obtained on the basis of the function F1 at the frequency f1 in the same way as above.

As described above, the feature points of the functions F0 and F1 at the frequencies f0 and f1 can be obtained. Further, in FIG. 3, the feature points of the functions F0 and F1 at each frequency can be obtained per constant frequency interval (Δf) in the same way as above. The coefficient intensity data of the respective feature points and the time data are decided as transmission data.

Figure 6:
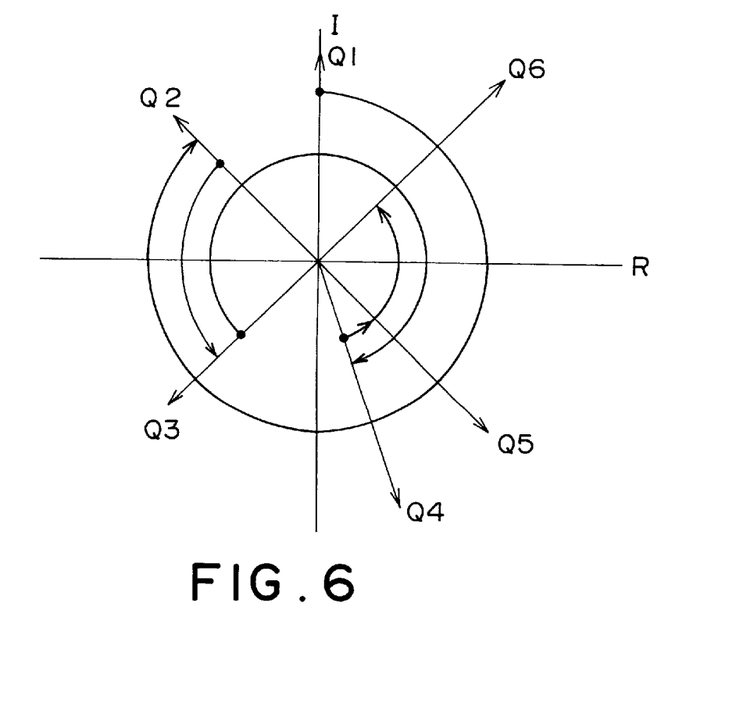
FIG. 6 is a graphical representation of complex number plane for assistance in explaining the phase change status of the feature points.

Further, in the present embodiment, since the FFT (Fast Fourier Transform) method is adopted for the orthogonal transformation, it is possible to obtain phase data in addition to the above-mentioned data at each feature point. For instance, in FIG. 6, at the feature points Q1, Q2, Q3, . . . , the phase change from the feature point Q1 to the feature point Q2 describes a circular arc shaped locus as shown by an arrow on the complex number plane shown in FIG. 6. It is possible to obtain the phase difference data (e.g., −320 degrees in this case) in addition to the above-mentioned data at the feature point Q2.

Therefore, the block orthogonal transfer function data can be transformed to the feature point data (the frequency data, coefficient intensity data, time data and phase data) with respect to each of the functions F0 and F1. However, the change in spectrum coefficient intensity of the orthogonal transform function of audio signals is relatively gentle as shown in FIG. 4, even if an abrupt amplitude change such as a shock sound is included. The number of the feature points obtained at each frequency is thus extremely small.

In other words, in FIG. 4, the number of the feature points (shown by white circular points) of each of the functions F0 and F1 is very small, as compared with the number of data points per period ΔT (shown by black circular points). It is thus possible to markedly compress the transmitted data by transmitting only the data at the feature points.

Further, since each of the functions F0 and F1 corresponds to one frequency, the feature point data related to each of the functions F0 and F1 can be collected as one frequency data. That is, the coefficient intensity data at each feature point can be represented as a difference between the preceding coefficient intensity data and the current data; and the phase data at each feature point can be represented by a difference between the preceding phase data and the current data; and the time data at each feature point can be represented by an integer time of the period ΔT. As a result, it is possible to suppress an increase of data quantity.

Further, in more practical way, the superiority of the audio data compression method of the present embodiment can be explained as follows:

Now, when audio signals are sampled at a sampling frequency of 44 kHz, the number of the sampled values per second is 44000 values. The maximum frequency of the spectrum represented by this number of sampled values is 22 kHz on the basis of Nyquist theory.

When 1024 sampled values are taken per block, and the sampled values are orthogonal-transformed in accordance with the FFT method, the total number of the feature points is 512 (=22000/43), even if the orthogonal transform function is assumed to have a feature point at each frequency. Because the frequency interval Δf is about 43 Hz (=44000/1024).

Therefore, the total number of data including both the coefficient intensity data and the phase data is 1024 (=512× 2), which is the same as the number of block sampled values.

Here, Table 1 lists the number of extracted feature points of the present embodiment, in which average audio signals are divided into 10 blocks.

TABLE 1

| SPECTRUM COEF INTENSITY | NUMBER OF FEATURE POINTS | NUMBER OF DATA |
| --- | --- | --- |
| 0–7 | 2 | 16 |
| 8 | 4 | 4 |
| 9–20 | 2 | 24 |
| 21 | 4 | 4 |
| 22–30 | 2 | 18 |
| 31 | 5 | 5 |
| 32 | 4 | 4 |
| 32–50 | 2 | 36 |

TABLE 1-continued

| SPECTRUM COEF INTENSITY | NUMBER OF FEATURE POINTS | NUMBER OF DATA |
|---|---|---|
| 51–511 | 1 | 461 |
| | TOTAL | 572 |

Table 1 indicates the following fact: When each feature point is represented by two data of the coefficient intensity data and the phase data, the number of data is 1144 (=572× 2). This number, however, is about ⅑ of the number (1024×10=10240) of the sampled values included in 10 blocks. The number included in these blocks is the total number of the feature points obtained when the orthogonal transfer function has a feature point at each frequency. Therefore, even if the frequency data and the time data are both added at each feature point, it is possible to reduce the number of data down to about ⅖ of the number of the sampled values.

Further, in the above description, although the compression ratio has been compared with respect to the number of data, roughly the same compression ratio can be obtained with respect to the quantity of actually quantized data.

Further, when average audio signals are compressed in accordance with the ADPCM method (the sampling frequency: 44.1 to 48 kHz, and 16-bit quantization), the compression ratio is about ½, so that it is clear that the compression method according to the present embodiment is superior.

In FIG. 1, the data obtained as described above by the feature point extractor 6 are transferred to the transfer data arranger 7 to arrange the data per feature point in accordance with a predetermined arrangement rule (e.g., the data are arranged in the order of coefficient numbers obtained on the orthogonal axis of the orthogonal function when the data are formed). The arranged data are transferred to the transmitter 8. Then, the transmitter 8 sequentially transmits the data to the transfer path (or a storage media) 9 in sequence.

In this case, since the quantity of audio signal data can be compressed markedly, an extremely high transmission efficiency can be obtained, or the audio signal data can be stored in a data storage medium of a small capacity.

Next, in FIG. 1, the reception system decompresses and reproduces the received data in accordance with the following procedure:

First, data transmitted through the transmission path (or the storage media) 9 are received by the receiver 10, and then transferred to the interpolator 11. The interpolator 10 interpolates the spectrum coefficient intensity between the feature points on the basis of the received feature point data.

For instance, in the case of the function F0 or F1 as shown in FIG. 4, a function F0' approximated to the original function F0 can be reproduced by approximately interpolating the black circular points on the basis of the prediction using the feature points Q1, Q2, Q3, . . . In the same way, a function F1' approximated to the original function F1 can be reproduced by approximately interpolating the black circular points on the basis of the prediction using the feature points P1, P2, P3, . . .

Therefore, at this stage, the orthogonal transform function corresponding to each block as shown in FIG. 3 can be reproduced approximately. The reproduced orthogonal transfer functions are transferred to the inverse-orthogonal transformer 12.

The inverse-orthogonal transformer 12 reproduces sampled values per block by executing inverse-transformation to each orthogonal transform function. In this case, the sampled values are obtained by inversely transforming the approximate orthogonal transfer function obtained by interpolating the feature points. Therefore, although the reproduced sampled values do not perfectly match the quantization level sampled on the compression side, it is possible to reproduce the sampled values in a range in which the reproduced sound quality will not deteriorate.

The phase data included in the transferred data is supplied to a phase compensating circuit (not shown) incorporated in the inverse-orthogonal transformer 12. The phase compensating circuit compensates for the phase distortion on the basis of the phase data to reproduce the sampled values of the audio signals with a higher fidelity.

The reproduced sampled values per block is processed in accordance with the approximate interpolation by the interpolator 11. This results in a slight error between the interpolated sampled values and the original sampled values. Therefore, when the blocks are connected sequentially, there exists the case where the continuity is lost between the sampled values of two adjacent blocks.

Figure 7:
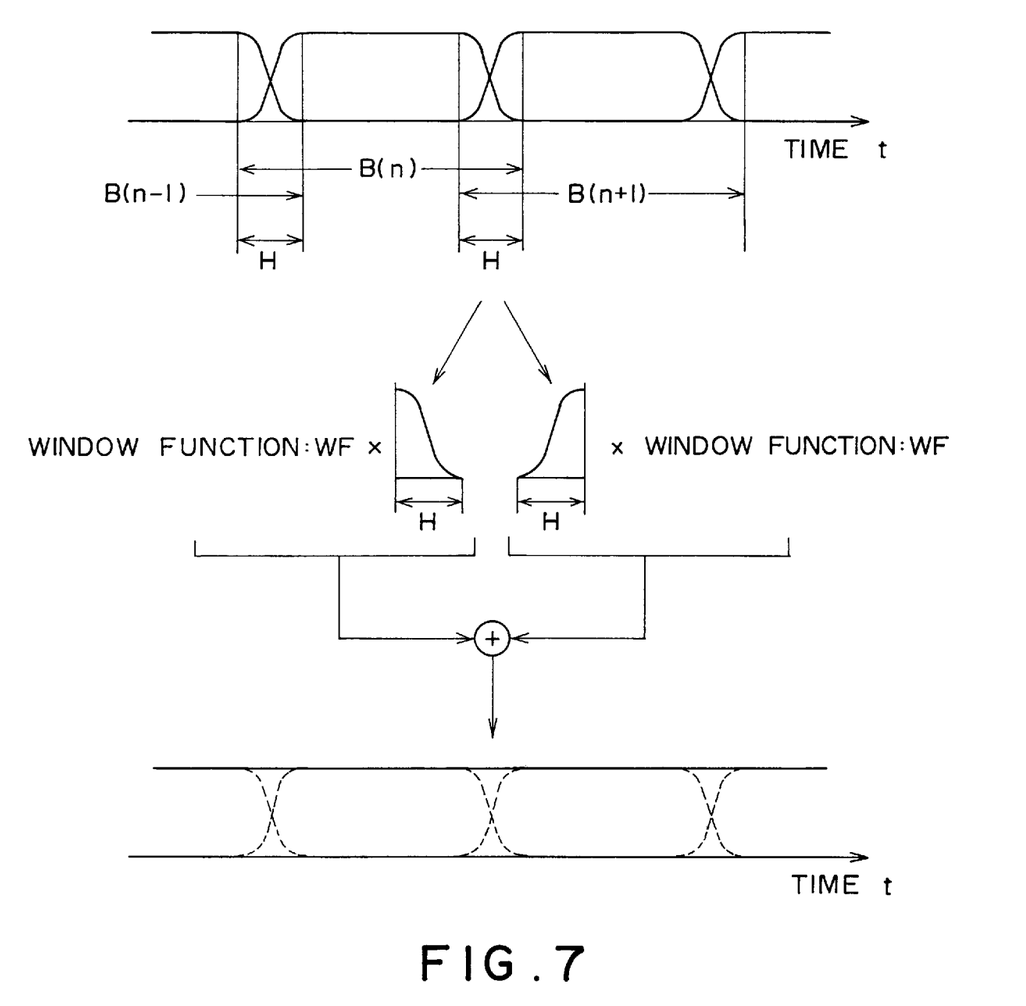
FIG. 7 is a graphical representation for assistance in explaining how a window function multiplier works.

To overcome this problem, in this embodiment, a window function multiplier 13 is provided at the succeeding stage of the inverse-orthogonal transformer 12. As shown in FIG. 7, the window function multiplier 13 overlaps a front end portion of a block B(n) with a rear end portion of an anterior block B(n−1). Further, a rear end portion of the block B(n) is overlapped with a front end portion of a posterior block B(n+1). Each overlapped portion H is multiplied by a window function: WF (e.g., sine square, cosine square, Hunning, Hamming, etc.) and then added to each other in order to secure the continuity among the three adjacent blocks B(n−1), B(n), and B(n+1). The window function multiplier 4 has the same function as that of the window function multiplier 13.

The sampled values per block whose continuity has been secured are sequentially transferred to the D/A converter 14 and converted into analog signals. The analog signals are amplified by the amplifier 15 and then outputted through the speaker 16 as the reproduced audio signals.

The window function multipliers 4 and 13, the feature point extractor 6, and the transmitted data arranger 7 shown in FIG. 1 will be described in more detail.

Figure 8:
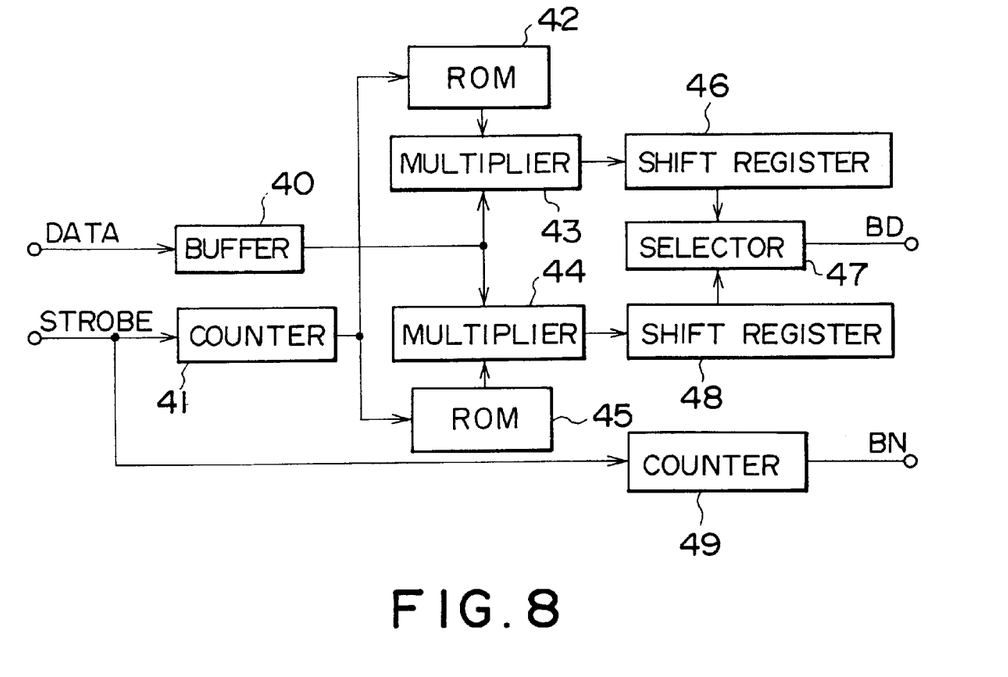
FIG. 8 is a block diagram showing the window function multipliers shown in FIG. 1.

FIG. 8 shows a block diagram of the window function multipliers 4 and 13. The following explanation focuses on the window function multiplier 4. The string of discretely quantized data as shown in FIG. 7 obtained by the A/D converter 3 of FIG. 1 is fed to a buffer memory 40.

Further, strobe signals that indicate data timings are supplied to a counter 41. The strobe signals are counted by the counter 41 from a reference time to detect the location of each data.

The detected location of each data is sent as an address to ROMs 42 and 45 that have a window function table. Each ROM generates a window function value corresponding to the time at which data is located. There are two ROMs provided because two window periods adjacent to each other are overlapped each other as shown in FIG. 7, so that counting should be made separately.

The window function values sequentially generated by the ROMs 42 and 45 are supplied to multipliers 43 and 44, respectively. Also supplied to the multipliers 43 and 44 is the string of discretely quantized data stored in the buffer memory 40. The multipliers 43 and 44 sequentially multiply the window function values and the discretely quantized data and send shift pulses to shift registers 46 and 48, respectively. The shift pulses correspond to the strobe signals.

Each shift resister has a storage capacity corresponding to one block B(n) shown in FIG. 7. The parallel outputs of the shift resisters 46 and 47 are supplied to a selector 47. The selector 47 alternatively selects the parallel outputs and outputs data blocks BD that are supplied in parallel to the orthogonal transformer 5 of FIG. 1.

The strobe signals are supplied to a counter 49 that divides the strobe signals by the number of data in one block to obtain the number of one data block. The number data BN is also supplied in parallel to the orthogonal transformer 5.

Figure 9:
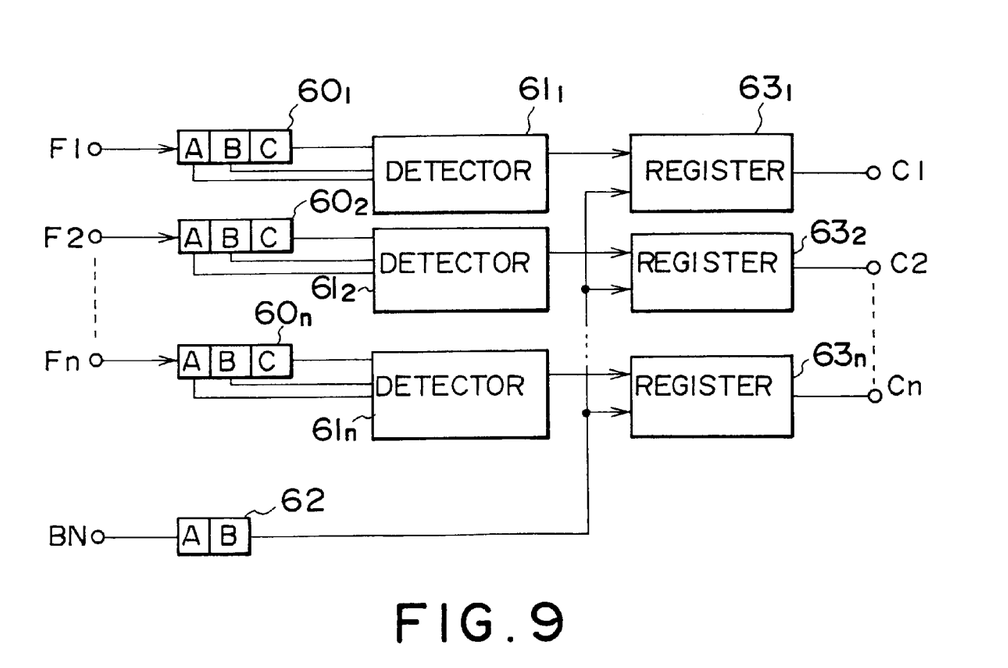
FIG. 9 is a block diagram showing the feature point extractor shown in FIG. 1.

FIG. 9 shows a block diagram of the feature point extractor 6. Sequential orthogonal transform functions F1, F2, . . . , and Fn at different frequencies per block obtained by the orthogonal transformer 5 are applied to shift resisters $60_1$, $60_2$, . . . , and $60_n$.

Orthogonal transform function components A, B, and C of each of the functions F1, F2, . . . , and Fn are sequentially applied to and held by the shift registers $60_1$, $60_2$, . . . , and $60_n$. The components A, B, and C are then applied to detector $61_1$, $61_2$, . . . , and $61_n$. Each detector executes the process already described with reference to FIG. 5 to determine whether the component B is a feature point, and generates a feature point judge signal.

A block number signal BN indicating the number of the block in which the component B is included is also supplied by the orthogonal transformer 5 to and held by a block number shift register 62. The block number signal BN is then applied to and held by registers $63_1$, $63_2$, . . . , and $63_n$ when the feature point judge signals are applied thereto from the detectors $61_1$, $61_2$, . . . , and $61_n$, respectively, as trigger signals.

The register $63_1$, $63_2$, . . . , and $63_n$ generate block number signals C1, C2, . . . , and Cn per component of the orthogonal transform functions F1, F2, . . . , and Fn, respectively. The block number signals C1, C2, . . . , and Cn are then supplied to the transfer data arranger 7 shown in FIG. 1.

Figure 10:
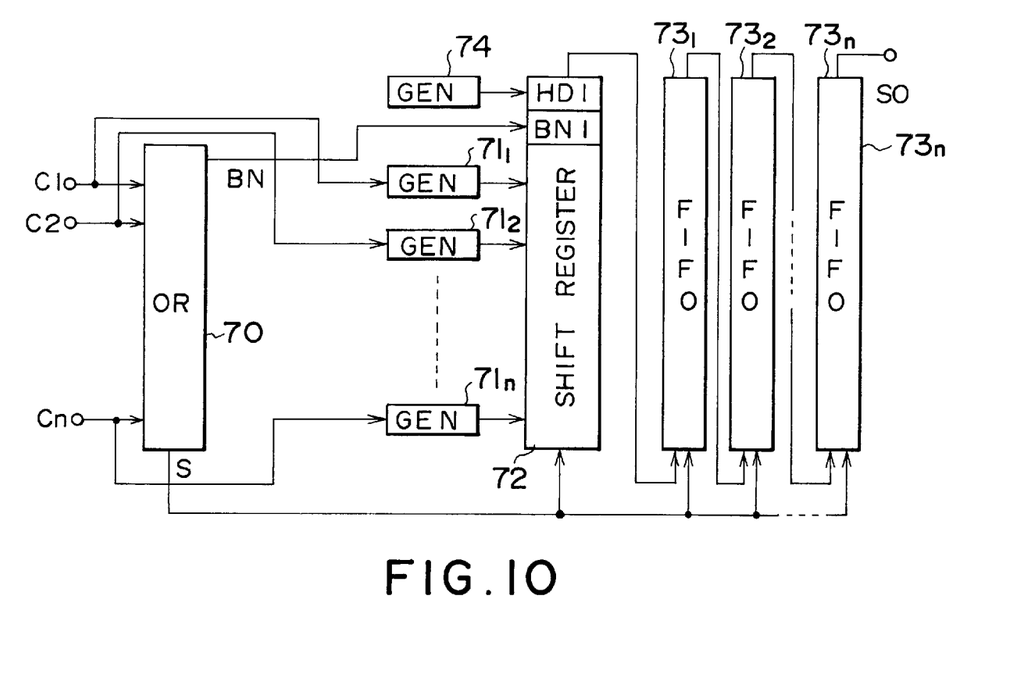
FIG. 10 is a block diagram showing the transfer data arranger shown in FIG. 1.

FIG. 10 shows a block diagram of the transfer data arranger 7. The block number signals C1, C2, . . . , and Cn are supplied in parallel to an OR circuit 70. When at least any one of the block number signals C1, C2, . . . , and Cn carries the number BN of the block that is determined to have a feature point, this block number signal is supplied to a shift register 72 and held by its stack BN1.

The block number signals C1, C2, . . . , and Cn each carrying the number BN of the block that is determined to have a feature point are also supplied to feature point component number generators $71_1$, $71_2$, . . , and $71_n$, respectively. The feature point component number generators generate component number signals. The component number signals are supplied in parallel to the shift register 72.

Immediately after this, the OR circuit 70 generates a control signal S that is applied to the shift resister 72 and also to first-in-and first-out type shift registers $73_1$, $73_2$, . . . , and $73_m$. In response to the control signal S, all the signals held by the shift register 72 is rapidly shifted to the shift registers $73_1$, $73_2$, . . . , and $73_m$.

A header information is supplied to a header generator 74. The header generator 74 generates a header signal that is supplied to the shift register 72 and held by its stack HD1. The header signal indicating a header and a length of a variable length data. This header signal can be obtained by a well known method.

Figure 11A:
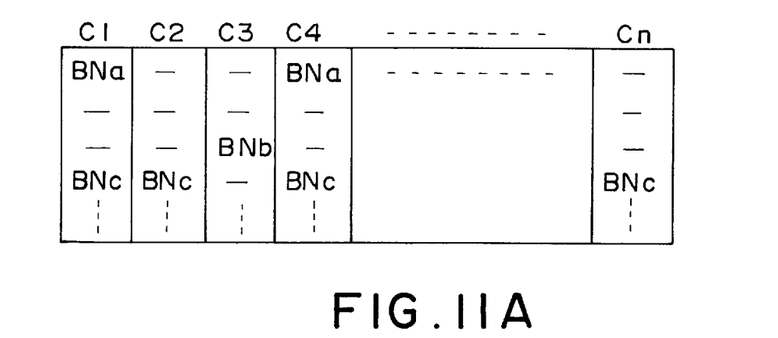
FIG. 11A and 11B are views explaining feature point arrangement.

As shown in FIG. 11A, the block number signals C1, C2, . . . , and Cn generated by the feature point extractor 6 carry the block numbers. For example, the block number signal C1 carries the block numbers BNa, . . . , BNc, . . . The symbol "-" denotes a block from which no feature point is extracted.

Figure 11B:
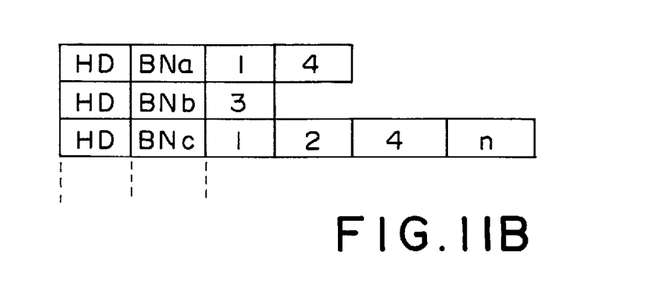

In response to the signals C1, C2, . . . , and Cn, the transfer data arranger 7 generates serial data strings SO arranged as shown in FIG. 11B. Each data string consists of a header HD, a block number BN from which a feature point is extracted, and at least one number of orthogonal function that includes the block. Thus, the coefficient intensity data, the frequency data, and the time data of the feature points arranged according to FIG. 11B are supplied to the transmitter 8 of FIG. 1.

In this embodiment, since the audio signals are compressed and decompressed by the transmission and reception system, it is possible to prevent the reproduced sound quality from deteriorating, in spite of the fact that the audio data can be compressed markedly.

Further, the embodiment adopts the FFT method as the orthogonal transform method. Not only this, other various transform methods such as cosine transform, sine transform, Hadamard-Walsh transform, Karhunen-Loeve transform, etc. can be used.

In addition, Wavelet transform as the pseudo orthogonal transform method can be also adopted.

In this pseudo transform method, a fundamental Wavelet (wave and particles) function h(t) existing locally on both the time axis and the frequency axis is used. That is, when a gentle waveform change (low frequency components) is detected, the fundamental function is multiplied by "a" times on the time axis, whereas, when an abrupt waveform change (high frequency components) is detected, the waveform is similarity-transformed down to 1/"a" as the fundamental function. Further, in order to find the time at which the waveform change occurs, the waveform is parallel-shifted on the time axis by "b" sec, to form the fundamental function.

That is, the fundamental function is represented by the following formula (1); the Wavelet transform function is represented by the following formula (2); and the original signal reversely transformed is represented by the following formula (3), respectively.

$$h_{a,b}(t) = \frac{1}{\sqrt{a}} h\left(\frac{t-b}{a}\right) \qquad (1)$$

$$F(a, b) = \langle h_{a,b}(t) | f(t) \rangle = \frac{1}{\sqrt{a}} \int_{-\infty}^{+\infty} h\left(\frac{t-b}{a}\right) f(t) dt \qquad (2)$$

$$f(t) = \frac{2}{(A+B)} \sum_{a,b} F(a, b) h_{a,b}(t) \qquad (3)$$

where $$A < f(t)|f(t)> \leq \Sigma |<h_{a,b}(t)|f(t)>|^2 \leq B < f(t)|f(t)>$$

Therefore, when the Wavelet transform and its inverse transform are applied to the present embodiment, it is possible to analyze high frequency components (when the signal changes abruptly) at a high time resolution and to analyze lower frequency components (when the signal changes gently) at a high frequency resolution. In addition, since a local waveform having no dc components is analyzed, there exists such an advantage that audio signals can be transformed by detecting the change points of the signal waveform with a high sensitivity. As a result, numerically-stable reproduced audio signals can be obtained by the inverse transform.

As described above, the audio signal compression and decompression method according to the present invention has the following effects:

The compression and extension method and apparatus according to the present invention are suitable for the features of audio signals. Therefore, it is possible to improve the compression ratio of the transmitted data markedly, as compared with the various conventional compression methods. Further, it is possible to increase the transmission efficiency of audio data or to reduce the capacity of the storage medium.

Further, it is possible to enable a precise transformation according to the change of audio signal waveforms. Further, it is possible to achieve the stable signal reproduction by inverse-transformation.

Further, it is possible to enable signal reproduction of a high fidelity and a less phase distortion, by transmitting phase data obtained simultaneously during the process of the orthogonal transformation of the audio signal sampled values.

What is claimed is:

1. A method of compressing and decompressing an audio signal, comprising the steps of:

sampling an audio signal per regular sampling interval to obtain a constant number of sampled values;

orthogonal transforming the sampled values per constant period to obtain sequential orthogonal transfer functions;

extracting feature points representing change in coefficient intensity of the orthogonal transfer functions per constant frequency interval; and obtaining coefficient intensity data, frequency data, and time data of the feature points;

reproducing the orthogonal transfer functions by interpolating the coefficient intensity of the orthogonal transfer functions on the basis of the coefficient intensity data, frequency data, and time data;

inverse-orthogonal transforming the reproduced orthogonal transfer functions to reproduce the a constant number of sampled values; and converting the reproduced sampled values into the audio signal.

2. The method according to claim 1, further comprising the steps of:

dividing the sampled values into blocks per constant number of the sampled values;

overlapping sampled values at a front end portion of one block with sampled values at a rear end portion of an anterior block, and sampled values at a rear end portion of the one block with sampled values at a front end portion of a posterior block;

multiplying overlapped portions of the front end portion of the one block and the rear end portion of the anterior block by a window function, and overlapped portions of the rear end portion of the one block and the front end portion of the posterior block by the window function; and adding the multiplied overlapped portions of the front end portion of the one block and the rear end portion of the anterior block to each other, and the multiplied overlapped portions of the rear end portion of the one block and the front end portion of the posterior block to each other, to obtain sampled values to be orthogonally transformed.

3. The method according to claim 1, wherein, the reproduced sampled values are divided into blocks per constant number of audio signal sampled values, the blocks including at least a present block, an anterior block, and a posterior block, the method further comprising the steps of:

overlapping sampled values at a front end portion of the present block with sampled values at a rear end portion of the anterior block, and sampled values at a rear end portion of the present block with sampled values at a front end portion of the posterior block;

multiplying overlapped portions of the front end portion of the present block and the rear end portion of the anterior block by a window function, and overlapped portions of the rear end portion of the present block and the front end portion of the posterior block by the window function; and adding the multiplied overlapped portions of the front end portion of the present block and the rear end portion of the anterior block to each other, and the multiplied overlapped portions of the rear end portion of the present block and the front end portion of the posterior block to each other to obtain reproduced sampled values.

4. A method of compressing and decompressing an audio signal, comprising the steps of:

sampling an audio signal per regular sampling interval to obtain sampled values;

orthogonal transforming the sampled values per constant period to obtain sequential orthogonal transfer functions;

extracting feature points representing change in coefficient intensity of the orthogonal transfer functions per constant frequency interval; and obtaining coefficient intensity data, frequency data, and time data of the feature points;

reproducing the orthogonal transfer functions by interpolating the coefficient intensity of the orthogonal transfer functions on the basis of the coefficient intensity data, frequency data, and time data;

inverse-orthogonal transforming the reproduced orthogonal transfer functions to reproduce the sampled values; and converting the reproduced sampled values into the audio signal, wherein the extracting step comprises:

extending a vector from a first point as one of the feature points on an orthogonal transfer function among the sequential orthogonal transfer functions to a second point on the orthogonal transfer function;

obtaining a length of a straight line between a third point on the vector and a fourth point on the orthogonal transfer function, the straight line being perpendicular to the vector;

judging whether the length of the straight line exceeds a predetermined length; and deciding the fourth point as another of the feature points when the judging is made.

5. The method according to claim 1, wherein the orthogonal transforming step employs Wavelet transform method, and the inverse-orthogonal transforming step employs inverse Wavelet transform method.

6. The method according to claim 1, further comprises the steps of:
   obtaining phase difference data among the feature points; and
   compensating for phase distortion of the reproduced orthogonal transfer functions on the basis of the phase difference data.

7. A method of compressing an audio signal, comprising the steps of:
   sampling an audio signal per regular sampling interval to obtain a constant number of sampled values;
   orthogonal-transforming the sampled values per constant period to obtain sequential orthogonal transfer functions;
   extracting feature points of change in coefficient intensity of the orthogonal transfer functions per constant frequency interval;
   obtaining coefficient intensity data, frequency data, and time data of each feature point, as compression data of the audio signals and
   interpolating the coefficient intensity of the orthogonal transfer functions on the basis of the coefficient intensity data, frequency data, and the time data.

8. The method according to claim 7, further comprising the steps of:
   dividing the sampled values into blocks per constant number of the sampled values;
   overlapping sampled values at a front end portion of one block with sampled values at a rear end portion of an anterior block, and sampled values at a rear end portion of the one block with sampled values at a front end portion of a posterior block;
   multiplying overlapped portions of the front end portion of the one block and the rear end portion of the anterior block by a window function, and overlapped portions of the rear end portion of the one block and the front end portion of the posterior block by the window function; and
   adding the multiplied overlapped portions of the front end portion of the one block and the rear end portion of the anterior block to each other, and the multiplied overlapped portions of the rear end portion of the one block and the front end portion of the posterior block to each other, to obtain sampled values to be orthogonally transformed.

9. The method according to claim 7, wherein the orthogonal transforming step employs Wavelet transform method.

10. The method according to claim 7, further comprising the step of obtaining phase difference among the feature points as the compression data.

11. A method of decompressing an audio signal, comprising the steps of:
   reproducing sequential orthogonal transfer functions obtained by orthogonal-transforming a constant number of sampled values of an audio signal, the orthogonal transfer functions having feature points representing change in coefficient intensity of the orthogonal transfer functions, the feature points having coefficient intensity data, frequency data, and time data, by interpolating the coefficient intensity of the orthogonal transfer functions on the basis of the coefficient intensity data, frequency data, and time data;
   inverse-orthogonal-transforming the reproduced orthogonal transfer functions, to reproduce the sampled values; and
   converting the sampled values into the audio signal.

12. The method according to claim 11, wherein, the reproduced audio signal sampled values are divided into blocks per constant number of audio signal sampled values, the blocks including at least a present block, an anterior block, and a posterior block, the method further comprising the steps of:
   overlapping sampled values at a front end portion of the present block with sampled values at a rear end portion of the anterior block, and sampled values at a rear end portion of the present block with sampled values at a front end portion of the posterior block;
   multiplying overlapped portions of the front end portion of the present block and the rear end portion of the anterior block by a window function, and overlapped portions of the rear end portion of the present block and the front end portion of the posterior block by the window function; and
   adding the multiplied overlapped portions of the front end portion of the present block and the rear end portion of the anterior block to each other, and the multiplied overlapped portions of the rear end portion of the present block and the front end portion of the posterior block to each other, to obtain reproduced audio signal sampled values.

13. The method according to claim 11, wherein the inverse-orthogonal-transforming step employs inverse Wavelet transform method.

14. The method according to claim 11, wherein the feature points have phase difference data among the feature points, further comprising the step of compensating for phase distortion of the reproduced orthogonal transfer functions on the basis of the phase difference data.

15. An apparatus for compressing an audio signal, comprising:
   means for sampling an audio signal per regular sampling interval to obtain a constant number of sampled values;
   means for orthogonal transforming the sampled values per constant period to obtain sequential orthogonal transfer functions;
   means for extracting feature points representing change in coefficient intensity of the orthogonal transfer functions per constant frequency interval;
   means for obtaining coefficient intensity data, frequency data, and time data of the feature points; and
   means for interpolating the coefficient intensity of the orthogonal transfer functions on the basis of the coefficient intensity data, frequency data, and the time data.

16. The apparatus according to claim 15, further comprising:
   means for sequentially checking locations of the sampled values on a time axis;
   means, responsive to the locations, for generating window function values;
   means for multiplying the sampled values and the window function values;
   means for holding the multiplied results per predetermined number of sampled values;
   means for selectively outputting the multiplied results thus held per predetermined number of sampled values, the output multiplied results being to be orthogonally transformed.

17. An apparatus for compressing an audio signal; comprising:
   means for sampling an audio signal per regular sampling interval to obtain sampled values;

means for orthogonal transforming the sampled values per constant period to obtain sequential orthogonal transfer functions;

means for extracting feature points representing change in coefficient intensity of the orthogonal transfer functions per constant frequency interval; and means for obtaining coefficient intensity data, frequency data, and time data of the feature points, wherein the extracting means comprises:

means for extending a vector from the anterior sampled value as one of the feature points on each orthogonal transfer function to the posterior sampled value, obtaining a length of a straight line between a point on the vector and the present sampled value, the straight line being perpendicular to the vector, judging whether the length of the straight line exceeds a predetermined length, and deciding the present sampled value as another of the feature points when the judging is made, thus generating a feature point judge signal; and means, responsive to the feature point judge signal, for generating a group signal indicating a data group to which the present sampled value decided as the another of the feature points belongs in each orthogonal transfer function.

18. The apparatus according to claim 17, further comprising: means, responsive to the group signal, for holding an address of the data group;

means, responsive to the group signal, for generating a component signal indicating a component of each orthogonal transfer function, the component corresponding to the data group to which the present sampled value decided as the another of the feature points belongs;

means for generating a header signal related to the data group; and means for serially outputting the header signal, address, and component signal, the coefficient intensity data, frequency data, and time data of each feature point being arranged according to the serially output header signal, address, and component signal.

19. An apparatus of decompressing an audio signal, comprising:

means for reproducing sequential orthogonal transfer functions obtained by orthogonal-transforming a constant number of sampled values of an audio signal, the orthogonal transfer functions having feature points representing change in coefficient intensity of the orthogonal transfer functions, the feature points having coefficient intensity data, frequency data, and time data, by interpolating the coefficient intensity of the orthogonal transfer functions on the basis of the coefficient intensity data, frequency data, and time data;

means for inverse-orthogonal-transforming the reproduced orthogonal transfer functions, to reproduce the sampled values; and means for converting the sampled values into the audio signal.

20. The apparatus according to claim 19, further comprising: means for sequentially checking locations of the reproduced sampled values on a time axis;

means, responsive to the locations, for generating window function values;

means for multiplying the reproduced sampled values and the window function values;

means for holding the multiplied results per predetermined number of reproduced sampled values; and means for selectively outputting the multiplied results thus held per predetermined number of reproduced sampled values, the output multiplied results being to be converted.

* * * * *